United States Patent Office 3,551,992
Patented Jan. 5, 1971

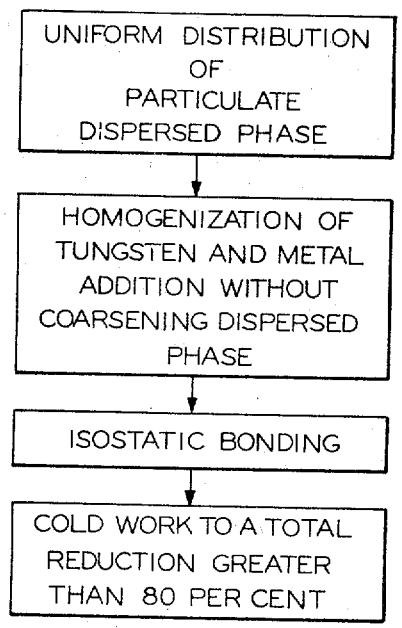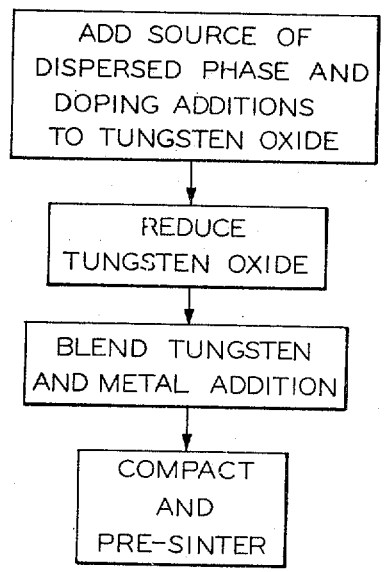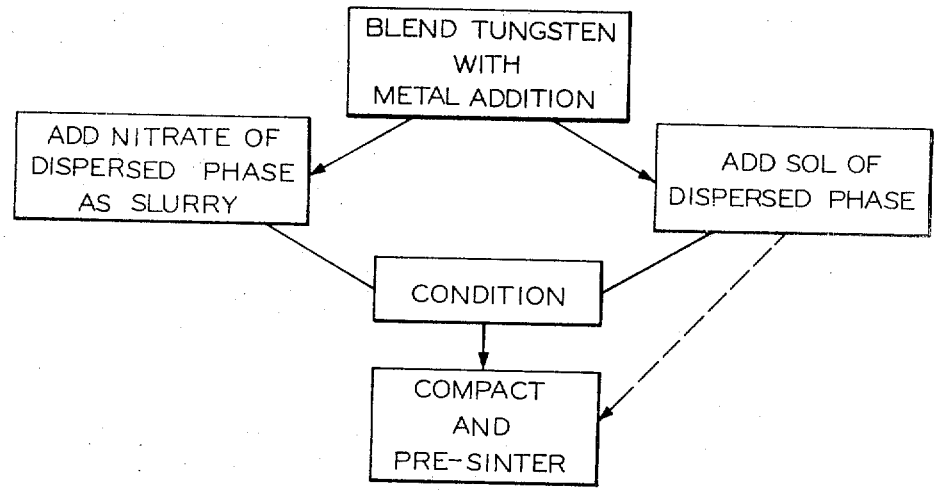

1

3,551,992
METHOD OF PRODUCING DUCTILE-TUNGSTEN BASE SHEET ALLOY
Daniel J. Maykuth and Horace R. Ogden, Columbus, Ohio, assignors, by mesne assignments, to The Battelle Development Corporation, Columbus, Ohio, a corporation of Delaware
Filed Oct. 15, 1965, Ser. No. 496,588
Int. Cl. B22f 3/24
U.S. Cl. 29—420.5                                7 Claims

ABSTRACT OF THE DISCLOSURE

A method for making a ductile tungsten-base sheet alloy is described. Particulate tulngsten, a minor proportion of another metal, such as Group VII and VIII metals, and a metal oxide, such as thoria, zirconia or hafnia is blended. The tungsten may be obtained by chemical reduction of tungsten oxide and may be doped with for example, an alkali silicate or aluminum chloride to provide an interlocked grain structure for tungsten in the recrystallization condition. The homogenized product is heated to a temperature above 2000° C. in a vacuum or inert atmosphere, isostatically bonded and cold worked. The product has a small recrystallized grain size, and room temperature ductility in the wrought and recrystallized condition.

---

This invention relates to a ductile tungsten-base sheet alloy containing a combination of solid solution alloy and a dispersed stable phase. More particularly, this invention relates to the aforesaid alloy and method of making the same wherein substantial room temperature ductility in both the wrought and recrystallized conditions are provided to an extent heretofore unobtainable in a low alloy tungsten base sheet. The invention further relates to the above alloy and method of making the same wherein said alloy is characterized by a small recrystallized grain size thereby conferring upon said alloy favorable properties in the recrystallized state.

Because tungsten is possessed of the highest melting point known to the common structural metals ($\cong$6150° F.), its use is increasing for structural applications in environments capable of producing extremely high temperatures. This acceptance continues notwithstanding certain major disadvantages inherent in the material such as difficulties in fabrication and brittleness at moderate temperatures. These limitations especially impede more widespread use of tungsten as sheet material needed for adaptation to configurations such as engines or airframes.

It has also been recognized in the past that the potential of tungsten and tungsten alloys for operability at extremely high temperatures (e.g., 3000–4000° F.) could be further enhanced by improvements of strength and structural stability at these temperatures. In addition, increased recrystallization temperature and decreased recrystallized grain size are important factors that would improve the performance of tungsten under the conditions envisioned for its ultimate environment in many applications. To avoid making property improvements insignificant, they must be secured without substantially decreasing the melting point of tungsten. Although beneficial to provide structural integrity at elevated temperatures, the high melting point of tungsten obviates the use of traditional procedures for its fabrication into structural components. Conventional melting procedures cannot be used to provide tungsten metal. More exotic melting procedures require the expenditure of large amounts of energy to achieve melting of practical quantities of tungsten. The traditional approach to fabrication of tungsten components has been through the consolidation and compaction of metal powders. This technique has been applied with considerable success in the fabrication of tungsten wire. This has been particularly true for the case of filament wire wherein control over impurities and the purposeful addition of dopants have combined to produce excellent product. The application of similar techniques to the fabrication of sheet have not been successful in the absence of rigorous control. Lack of predictable grain size and low temperature brittleness are characteristic of sheet materials produced under conditions favorable for wire. Thus far, no low alloy tungsten sheet material fabricated by powder metallurgical techniques has provided satisfactory room temperature ductility in the wrought and recrystallized state. Limited success in achieving room temperature ductility has been achieved through the use of a tungsten alloy containing 25 percent of rhenium. However, this alloy is expensive and has a lower melting point than pure tungsten. Some further success has been attained by addition to tungsten powder of an inert dispersed phase to retard grain growth and a metal addition to lower the hardness of tungsten. Generally the combined additions are found to have a moderate beneficial effect on the properties of pure tungsten and the effect of each is additive. The addition of 5 weight percent of rhenium and 4 volume percent of thoria decreases the grain size after a 1-hour anneal at 1800° C. from 1000 grains/mm.$^2$ for pure tungsten to 5500 grains/mm.$^2$ for the alloy. The ductile to brittle transition temperature is lowered to 225° C. for the recrystallized condition and to 85° C. when given a stress relief anneal. Although displaying improved bend ductility, the alloy is not ductile at room temperature. Under many conditions including those where doped tungsten is used, the ternary alloys as described above must be sintered for long times causing uncontrollable grain growth.

In addition, the long sintering times needed to densify these alloys to the point at which they can be cold worked causes agglomeration of the dispersed phase. Where agglomeration occurs, the properties are found to diminish. Sintering times must be long enough to provide a product having a density equal to about 92 percent of theoretical density. A product of lesser density is characterized by interconnected oxidized pockets of porosity which cause the compact to break up during cold working.

It is one object of this invention to provide a tungsten sheet alloy having substantial room temperature ductility in both the recrystallized and wrought conditions.

It is a further object of this invention to improve the recrystallization behavior of tungsten sheet alloy in a manner such as to increase recrystallization temperature and decrease the recrystallized grain size.

It is a still further object of this invention to provide a tungsten sheet alloy having a useful strength at elevated temperatures.

It is another object of this invention to improve the properties of tungsten sheet alloy without compromising to melting point.

It is yet another object of this invention to provide a method of making a ternary tungsten sheet alloy containing an inert dispersed phase and a metal addition.

It is still another object of this invention to provide a method of making a ternary tungsten sheet alloy whereby a dense product containing a fine dispersed phase and a metal addition is provided for cold working to sheet.

In the drawings:

FIG. 1 is a flow sheet which illustrates schematically the steps comprising the method of this process.

FIG. 2 is a flow sheet which illustrates in greater detail the manner of carrying out the first step of FIG. 1.

FIG. 3 is a flow sheet which illustrates an alternative manner of carrying out the first step of FIG. 1.

It has been found through experimentation that a method and alloy can be provided that obviates many of the difficulties attendant upon methods and alloys previously in use. Briefly described, a composition is provided characterized by the ingredients set forth below:

(1) A commercially pure tungsten powder.
(2) A minor proportion of metal addition selected from the group VII and VIII metals having the ability to decrease the hardness of tungsten when in solid solution therewith.
(3) A minor proportion of particulate uniformly dispersed phase having a high negative free energy of formation at elevated temperature.

A method of making the composition described above is provided as set forth below:

(1) Processing to accomplish a uniform dispersion of a particulate dispersed phase.
(2) Homogenizing tungsten and a metal addition without coarsening the dispersed phase.
(3) Isostatic bonding at elevated temperature.
(4) Cold working to a total reduction greater than 80 percent.

The steps outlined above provide a product having a surprisingly small recrystallized grain size and room temperature ductility in the wrought and recrystallized conditions. The key step in accomplishing the desired result is that of isostatic bonding. This step enables the use of sintering times and temperatures sufficient to densify the product but not to agglomerate the dispersed phase or result in excessive grain growth. Doped tungsten powders have been found to be especially suitable for the method and composition of this invention. As used herein, doped tungsten powder refers to tungsten powder containing generally additions of alkaline compounds plus a second material that may be silica or alumina. A preferred doped tungsten powder (Type 218 manufactured by General Electric Co.) is made by adding small amounts of potassium silicate and aluminum chloride in aqueous solution to tungsten oxide powder, which is subsequently dried, washed, and reduced to metal with hydrogen. The term metal addition refers to the alloy addition to tungsten having the ability to decrease the hardness of tungsten when in solid solution therewith.

THE COMPOSITION

The tungsten base material employed herein should be a commercially pure grade. As previously described, controlled additions of impurities (dopants) to the tungsten have the ability to improve the properties of the alloy of this invention. The dopants provide an interlocked grain structure for tungsten in the recrystallized condition. For example, Type 218 tungsten recrystallizes to a slightly more coarse, irregularly shaped, interlocked structure than the uniformly equiaxed grain structure characteristic of pure tungsten.

The metal addition to the tungsten base comprises Group VII and VIII metals having the ability to decrease the hardness of tungsten when in solid solution therewith. Particularly effective solutes included within these groups are rhenium, osmium, ruthenium, platinum and iridium. Alloys prepared with metal additions of ruthenium and platinum present some difficulties in fabrication. The exact amount of the other alloys that can be used depends on striking a balance between their effect on acting to reduce hardness and continuously increasing solid solution hardening. For example, satisfactory results have been obtained by the addition of 0.3 percent by weight of iridium, 0.87 percent by weight of osmium and 5.0 percent by weight of rhenium. Actual alloy contents by weight of 0–10 percent of rhenium, 0–3 percent of osmium and 0–2 percent of iridium or combinations thereof are within a favorable range. The above quantities are presented by way of example only and not by way of limitation.

Addition of dispersed phase should be made with a view toward obtaining a fine and uniform dispersion within the matrix grains. The most effective dispersoid additives are those having a high negative free energy of formation at elevated temperature. Materials such as thoria, zirconia, and hafnia exemplify metal oxides within the required range of thermodynamic stability. These materials all have a negative free energy of formation equal or greater than about 100 kcal. per gram atom of oxygen at 1000° C. It has been discovered that additions of up to about 8 volume percent of dispersed phase favor increased grain refinement. In practice, densification or sintering and fabricability are optimum at a level of about 4 volume percent of dispersoid additive. The most effective additive in the tungsten base alloy of the present invention comprises about 4 volume percent (2.2 percent by weight) of thoria. Alloys containing similar amounts of zirconia are more difficult to fabricate but may be favored for reactor or other applications wherein the presence of thoria may be undesirable.

Referring to FIG. 1 a flow sheet is shown wherein the basic steps of the method of this process are outlined. These respective steps will be discussed in greater detail in connection with the ensuing discussions and the drawings referred to therein.

PROCESSING TO ACCOMPLISH PARTICLE DISPERSION

It has been found that a number of techniques can be used to accomplish a satisfactory particle dispersion in tungsten. Referring to FIG. 2, a sequence of steps is described that may be successfully applied to achieve the desired dispersion. Tungsten powder and a metal addition are mixed by appropriate means such as cone blending. Generally, within limits dictated by economy, the powders having the smallest particle sizes are favorable starting materials. It has been found that starting material passing through a No. 325 Screen (44 micron or .0017 inch sieve openings) is satisfactory. All screen mesh sizes mentioned herein are for U.S. Standard mesh screens unless indicated otherwise. Addition of dispersed material is made to accomplish as fine a dispersion as possible. In one embodiment wherein the dispersed phase comprises thoria ($ThO_2$), appropriate quantities of $Th(NO_3)_4$ are added to a blended mixture of tungsten and metal addition with sufficient distilled water to form a slurry. The slurry is then evaporated to dryness and the dried powder is subsequently pulverized and baked for sufficient time in hydrogen at a temperature and time (e.g. 2 hrs. at 600° C.) sufficient to decompose the nitrate. The resultant product is screened and blended. Alternatively, it has been found that where the dispersed material comprises thoria, very fine and uniform disperson can be achieved by addition of thoria as a sol. Numerous methods of preparation of thoria sol are available. For example, a procedure taught by Frey, A., and Kohlschutter, "Preparation of Colloidal Thorium Oxide," Z. Electrochem., 22, 145–161 (1916) has been found to be satisfactory. The sol is mixed thoroughly with the tungsten and the resultant mixture heated to evaporate to dryness. Although perhaps desirable in some instances, the conditioning step is not essential following addition of thoria as a sol. The mix can be ground and pulverized to −325 mesh. The powder made available from conditioning is compacted and pre-sintered preparatory to homogenization. The compaction provides a body of convenient shapes for homogenization and pre-sintering lends the body some green strength. Mechanical die pressing at about 50,000 p.s.i. followed by a pre-sinter for 1 hour at 1600° C. in an inert atmosphere are suitable. Other compaction procedures are well known to those skilled in the art of powder metallurgy. Although a pre-sinter is preferable, it may be possible, of course, to forego this step prior to homogenization.

The alternative series of steps shown in FIG. 3 is particularly desirable where a doped tungsten powder is used. Additions of dopant and a source of dispersed phase are made to tungsten oxide. Usual procedures such as reduction in hydrogen are applied to reduce the oxide to tungsten metal. Where a source of dispersed phase comprising a higher compound is used, dispersed phase can be secured during this step. The product of the reduction step is blended with a suitable metal addition and the resultant mix is compacted and pre-sintered as previously described. In certain cases, additions of dopant, a source of dispersed phase, and metal addition are made to tungsten oxide. The subsequent reduction step is carried out in a manner so as to include the homogenization of tungsten and metal addition as will be hereinafter described in greater detail.

HOMOGENIZATION

It will be apparent that within limits known to those skilled in the art, almost any combination of time and temperature can be applied to achieve homogenization of the tungsten and metal addition. The important feature of this step is to achieve homogenization without causing the agglomeration of the dispersed particles. Agglomeration imparts deleterious properties to the alloy. Sintering at 2800° C. and for ½ hour are satisfactory parameters of temperature and time to satisfy the above-mentioned requirements. Longer times at lower temperatures (e.g. as low as 2000° C.) are also satisfactory. In addition to homogenization and densification, the described step can be employed to reduce the amount of harmful oxide contained on the powder. Thus, a vacuum or reducing gas atmosphere is maintained during sintering. For doped tungsten materials, a hydrogen atmosphere is preferred to avoid loss of doping agents through sublimation at elevated temperature. Doped materials, particularly Type 218 tungsten, show less tendency to unstable grain growth during sintering in hydrogen as opposed to vacuum.

ISOSTATIC BONDING

Because the ternary alloys described herein cannot be sintered during the homogenization step to theoretical density needed for fabrication to sheet without agglomeration and coarsening of the dispersed phase, further processing to achieve favorable densification without coarsening is required. It has been discovered that the required density together with surprisingly improved properties are provided by the application of high isostatic pressure at elevated temperatures. Materials are most amenable to this type of consolidation when they are provided in granular form. Thus, the consolidated bars available from the sintering operation are crushed to fine particle size (e.g. —100 mesh). Any foreign matter introduced into the mass during crushing can be removed by the following sequence of cleaning operations:

(1) Wash with 50 percent HCl to remove iron
(2) Decant with distilled water
(3) Wash with 10 percent NaOH and vacuum filter
(4) Wash with distilled water
(5) Wash with ethyl alcohol
(6) Screen Where exceptional care is being exercised, the product can be deoxidized by moderate heating in hydrogen. This is not essential to successful operation. For isostatic pressing, the crushed powder is enclosed in a suitable thin-walled container of the desired shape and sealed under vacuum by electron-beam welding. The entire assembly is then heated to an elevated temperature in an autoclave confining an inert gas at high pressure. As the container deforms under these conditions, the isostatic pressure is uniformly transmitted to the powder thereby forcing all surfaces into intimate contact. A product having a density of greater than 92 percent of theoretical is obtained by application of 10,000 p.s.i. for 3 hours at 1600° C. The variables of time, pressure, and temperature can be adjusted within ranges of each of the values described above to give the favorable density for subsequent cold working.

COLD WORKING

In cold working the product from the isostatic bonding operation, it is generally desirable to achieve a high reduction at temperatures as close as possible to the recrystallization temperature. Total reductions greater than 85 percent and preferably greater than 90 percent should be sought. Cold working temperatures up to about 1600° C. can be used; the higher temperatures being more favorable for heavier sections. In addition, fabricability is improved at the higher temperatures to the extent that there is less edge cracking. Fabricability is also enhanced by surrounding the product from isostatic bonding in a molybdenum yoke and covering the same with molybdenum cover plates. A satisfactory schedule for the rolling operation is provided below:

| Rolling stage | Rolling temp., °C. | Percent reduction | | | Annealing conditions | |
|---|---|---|---|---|---|---|
| | | Per pass | At stage | Accumulated | Time, min. | Temp., °C. |
| Breakdown | 1,600 | 15 | 50 | 50 | 30 | 1,600 |
| Intermediate | 1,600 | 15 | 30 | a 68 | 15 | 1,600 |
| Intermediate b | 1,600 | 15 | 30 | 80 | 15 | 1,600 |
| Finish | 1,600 | 10 | 60 | 92 | 1 | 1,600 | a Rolling direction changed by 90 degrees after 68 percent reduction.
b Molybdenum yoke removed after this stage.

Cross rolling is found to provide a satisfactory balance of properties between the longitudinal and transverse dimensions of the finished alloy sheet.

The features of this invention can be further understood by reference to the following examples.

Example 1

A ½ x 3 x 3-inch sheet bar was prepared by following the steps outlined below:

(1) Type 218 tungsten and unalloyed rhenium powders cone blended for 5–6 hours.
(2) ThO₂ sol added, mixed well, and heated to evaporate to dryness
(3) Mix ground and screened through 325 mesh
(4) Mix prebaked at 600° C. in hydrogen; powder kept dry to avoid moisture adsorption
(5) Mix ground and screened through 325 mesh
(6) Mix cone blended for 1 hour, divided into 180-gram lots, and stored in drying oven until ready for pressing
(7) Pressing done into ¼ x ½ x 7-inch bars at 50,000 p.s.i.
(8) Bars presintered for 1 hour at 1600° C. in hydrogen
(9) Bars sintered for ½ hour at 2800° C. in dry hydrogen
(10) Sintered bars crushed to —100 mesh
(11) Crushed material washed with 50 percent HCl—H₂O until all iron removed
(12) Washed material decanted with distilled water
(13) 10 percent NaOH-water solution used to wash decanted material subsequently vacuum filtered until at least 1 liter of solution used
(14) Material washed with distilled water
(15) Material washed with ethyl alcohol
(16) Washed material screened through 100-mesh screen
(17) Screened material heated for 2 hours at 600° C. in hydrogen
(18) Material canned in molybdenum container for isostatic bonding
(19) Can welded shut
(20) Outside covers of titanium applied over molybdenum cans
(21) Isostatic bonding carried out at 2900° F. and 10,000 p.s.i for 3 hours.

After gas-pressure bonding, the actual sheet bar measured 0.45 x 3 x 3 inches and had a denstiy of about 92 percent of theoretical. The bar was edge trimmed to remove possible areas of low density and recanned in a molybdenum yoke having a 1-inch-wide border on all four edges. Molybdenum cover plates, 0.040 inch thick, were welded to the yoke to protect the top and bottom surfaces, and the canned sheet bar was then fabricated to good-quality sheet of 50-mil thickness using the rolling schedule outlined below:

(1) Breakdown roll through a 50 percent total reduction [1]
(2) Anneal ½ hour at 1550° C.
(3) Intermediate rolling to a 30 percent total reduction [1]
(4) Anneal ¼ hour at 1550° C.
(5) Change rolling direction 90°; intermediate rolling to a 30 percent total reduction [1]
(6) Anneal ¼ hour at 1550° C.
(7) Remove molybdenum cover; finish rolling using a 60 percent total reduction [1]
(8) Anneal 1 minute Total reduction 88 percent.

[1] Preheating to 1550–1600° C. between passes.

Chemical analysis of the fabricated bars revealed an alloy content by weight of 8.34 percent of rhenium, 1.99 percent of thoria and 0.0017 percent of carbon. Annealing studies showed that recrystallization was initiated after 1 hour at 1800° C. and was essentially complete after 1 hour at 2000° C. The recrystallized grain size was 165,000 grains/mm². This compares with a count of 4625 grains/mm.² obtained for a W-5Re-2.2ThO$_2$ prepared using an undoped tungsten base and ordinary press and sinter techniques for densification. Individual bend specimens of 30 to 35 mils in thickness by ¼- by ¾-inch were cut from the longitudinal and transverse directions of wrought material. A portion of the samples taken from both the transverse and longitudinal directions of the sheet were stress relief annealed for 1 hour at 1000° C. while another portion were recrystallized annealed at 2000° C. Bend tests were accomplished by bridging ground and electropolished bend specimens across a V-die and successively bending through an angle of 75 degrees with dies of progressively smaller radii until fracture occurred. Seven or eight specimens were tested at temperatures throughout the ductile-to-brittle transition range thus defining the transition material for a given material to within ± 25° C. Bend ductility is defined below in terms of the minimum temperature at which the material could withstand a 4T or 8T bend, where T represents the ratio of the smallest successful bend-die radius to the sheet thickness.

| [Bend Transition Temperature, ° C.] | | | | | | | |
|---|---|---|---|---|---|---|---|
| Longitudinal | | | | Transverse | | | |
| SRA [a] | | RX [b] | | SRA [a] | | RX [b] | |
| 4T | 8T | 4T | 8T | 4T | 8T | 4T | 8T |
| 100 | 25 | 150 | 25 | 250 | 25 | 200 | 25 |

[a] Stress relief annealed 1 hour at 1,000° C.
[b] Recrystallized annealed 1 hour at 2,000° C.

The value of 25° C. at 8T in the recrystallized condition compares to a previous low value of 225° C. for material of similar composition produced from a pure tungsten base and standard press and sinter techniques. Comparison of the longitudinal and transverse test results shows that no marked directionality in bend properties exists for this alloy sheet in either the stress relieved or recrystallized conditions.

Tensile specimens for both the stress relieved and recrystallized conditions were tested in both the longitudinal and transverse directions. Testing was done using a gage length of 0.5 inch in accordance with procedures recommended by Materials Advisory Board Report MAB–176–M, "Evolution Test Methods for Refractory Metal Sheet Materials." Mechanical properties are presented below.

| Test temp. °C. | Longitudinal direction [a] | | | Transverse direction [a] | | |
|---|---|---|---|---|---|---|
| | Ultimate strength, k.s.i. | Yield strength, k.s.i. | Elongation percent | Ultimate strength, k.s.i. | Yield strength, k.s.i. | Elongation, percent |
| | Stress-relieved 1 hour at 1,000° C. | | | | | |
| 25 | 187 | 167.5 | 7 | 188 | 177.5 | 4 |
| | Recrystallized 1 hour at 2,000° C. | | | | | |
| −40 | 151 | 150.5 | 4 | | | |
| 0 | 146 | 135 | 4 | | | |
| 25 | 134.5 | 128 | 6 | 138 | 131 | 6 |
| 150 | 133 | 127 | 11 | | | |
| 1,028 | 9.1 | | 44 | | | |

[a] All specimens tested at strain rate of 0.004 in./in./min. except at 1,920° C., where a strain rate of 0.005 in./in./min. was used to 6 percent strain when the rate was increased to 0.010 and continued to fracture.

The data show the existence of a significant degree of room temperature tensile ductility. It should be noted that recrystallization results in a marked decrease in room-temperature strength but does not significantly affect tensile elongation. The sheet material shows no significant directionality in room-temperature tensile properties in either the stress relieved or recrystallized conditions.

Example 2

Materials prepared from the same composition and in the same manner as hereinbefore described for Example 1 were rolled following a schedule permitting a total reduction of 82 percent. The temperature during rolling was controlled at 1450° C. for one sheet and at 1600 °C. for another. Bend ductility and recrystallized grain sizes of samples taken longitudinal to the rolling direction of the above sheets are presented below:

| Rolling conditions | | Bend transition temp., ° C. | | | | Recrytallized grain size, grams/m.² |
|---|---|---|---|---|---|---|
| Total reduction, percent | Temp., °C. | SRA [a] | | RX [b] | | |
| | | 4T | 8T | 4T | 8T | |
| 82 | 1,450 | | 0 | 280 | 125 | 75–150,000 |
| 82 | 1,600 | 125 | 10 | 250 | 170 | 85,000 |

[a] Stress relief annealed 1 hour at 1,000° C.
[b] Recrystallize annealed 1 hour at 2,000° C.

The lower total reduction of 82 percent as compared to the 88 percent reduction of Example 1 results in a lower recrystallized grain size and inferior bend ductility properties of the recrystallized material. The specimens produced with a rolling temperature of 1450° C. had a mixed recrystallized grain structure.

Example 3

With one exception, materials were prepared in the manner described for Example 1; namely, a dispersed phase of thoria was added by decomposition of $Th(No_3)_4$ as opposed to addition of thoria as a sol. Following isostatic bonding, a portion of the materials were rolled to a total reduction of 82 percent at temperatures of 1450° C. and 1600° C., while another portion were rolled to a total reduction of 92 percent. Chemical analysis showed a content of 5.06 weight percent of rhenium, 2.22 weight percent of thoria and 0.0025 weight percent of carbon. Bend ductility and recrystallized grain sizes of samples taken longitudinal to the rolling direction are given below:

| Rolling conditions | | Bend transition temp., ° C. | | | | Recrystallized grain size grams/m.² |
|---|---|---|---|---|---|---|
| Total reduction, percent | Temp., °C. | SRA [a] | | RX [b] | | |
| | | 4T | 8T | 4T | 8T | |
| 82 | 1,450 | 135 | 90 | 235 | 175 | 75,000 |
| 82 | 1,600 | 120 | 100 | | 125 | 50,000 |
| 92 | 1,600 | 90 | 10 | 125 | 100 | 225,000 |

[a] Stress relief annealed 1 hour at 1,000° C.
[b] Recrystallize annealed 1 hour at 2,000° C.

Tensile data for the above materials taken in a direction longitudinal to the rolling direction and tested following a stress relief anneal at 1000° C. for 1 hour are presented in the following tabulation:

| Test temp., °C. | Ultimate strength, k.s.i. | Yield strength, k.s.i. | Elongation, percent | Reduction of area, percent |
|---|---|---|---|---|
| 82 percent total reduction at 1,450° C. | | | | |
| 25 | 193 | 182 | 6.0 | 7.0 |
| 150 | 178 | 161 | 12.8 | 17.0 |
| 250 | 169 | 153 | 12.1 | 19.0 |
| 400 | 153 | 138 | 8.5 | 15.0 |
| 1,650 | 37 | 28 | 19.8 | 12.0 |
| 92 percent total reduction at 1,600° C. | | | | |
| 0 | 187 | 168 | 12.1 | 18.0 |
| 25 | 179 | 159 | 11.6 | 15.0 |

The room temperature ductility as displayed by a value of about 12 percent elongation is outstanding for the material given a total reduction of 92 percent at 1600° C.

The above examples are intended to be illustrative of the method and composition of the invention but are not intended to be limiting thereof. It will be apparent that a new and useful alloy for refractory sheet comprising tungsten, a metal addition having the ability to decrease the hardness of tungsten when in solid solution therewith, and a dispersed phase having a high negative free energy of formation at elevated temperature is provided. New and useful means for making the tungsten alloy into sheet are provided by a combination of steps whereby metal powders are brought into intimate contact and bonded at elevated temperature and pressure followed by severe cold work to produce a product having new and unique properties.

Many uses and advantages of this invention will be apparent to those having a need for an improved tungsten alloy. Without the described improvements, the applications in which tungsten can be usefully employed as sheet material would be severely limited.

What is claimed is :

1. A method of making an improved tungsten-base sheet alloy comprising the steps of:
   (a) forming a uniform mixture of (1) particulate tungsten, (2) a particulate metal addition selected from the group consisting of rhenium, osmium, ruthenium, platinum, iridium and combinations thereof, and (3) a particulate refractory metal oxide characterized by a negative free energy of formation greater than 98 kcal. per gram atom of oxygen at 1000° C., said particulate tungsten, said metal addition, and said metal oxide initially being fine enough to pass through a U.S. Standard 325 mesh screen,
      said metal addition being from 0.1 to 10.0 percent by weight of the admixed tungsten,
      said metal oxide being from 0.1 to 5.0 percent by weight of the admixed tungsten;
   (b) compacting said mixture to a density of from 40 to 70 percent of theoretical;
   (c) heating said compact in an environment selected from a vacuum and inert gas at a temperature above 2000° C. but below the softening point of said metal oxide until said tungsten and said metal addition are sintered and homogenized without agglomerating said metal oxide;
   (d) pulverizing the sintered and homogenized compact;
   (e) isostatically consolidating the pulverized particles in a nonreactive environment to a density at least 92 percent of the theoretical density of said tungsten alloy, said consolidating being done under temperature and pressure conditions that sinter said tungsten and said metal addition without agglomerating said metal oxide; and
   (f) cold working the consolidated material to a total reduction greater than about 80 percent.

2. The method of claim 1 wherein said refractory metal oxide is selected from the group consisting of thoria, zirconia, and hafnia and combinations thereof.

3. The method of claim 1 wherein said particulate metal addition is rhenium.

4. The method of claim 1 wherein said refractory metal oxide is thoria.

5. The method of claim 1 wherein said metal oxide is added in the form of a sol.

6. The method of claim 1 wherein said tungsten is alkali silicate and aluminum chloride doped.

7. A method of making an improved tungsten-base sheet alloy comprising the steps of:
   (a) forming a uniform mixture of (1) particulate tungsten and (2) a particulate metal addition selected from the group consisting of rhenium, osmium, ruthenium, platinum, iridium and combinations thereof, said particulate tungsten and said metal addition being fine enough to pass through a U.S. Standard 325 mesh screen, and said metal addition being from 0.1 to 10.0 percent by weight of the admixed tungsten;
   (b) blending said mixture with a metal nitrate, said metal nitrate being of a metal which forms a refractory metal oxide characterized by a negative free energy of formation greater than 98 kcal. per gram atom of oxygen at 1000° C., said metal intrate being from 0.1 to 5.0 percent by weight of the admixed tungsten;
   (c) heating said blend in a hydrogen environment to decompose the nitrate;
   (d) heating the resulting dispersion in an environment selected from a vacuum and inert gas at a temperature above 2000° C. but below the softening point of said metal oxide until said tungsten and said metal addition are sintered and homogenized without agglomerating said metal oxide;
   (e) pulverizing the sintered and homogenized compact;
   (f) isostatically consolidating the pulverized particles in a nonreactive environment to a density at least 92 percent of the theoretical density of said tungsten alloy, said consolidating being done under temperature and pressure conditions that sinter said tungsten and said metal addition without agglomerating said metal oxide; and
   (g) cold working the consolidated material to a total reduction greater than about 80 percent.

References Cited

UNITED STATES PATENTS

| | | | |
|---|---|---|---|
| 2,798,808 | 7/1957 | Iredell | 75—176 |
| 3,236,699 | 2/1966 | Pugh | 148—11.5 |
| 3,278,281 | 10/1966 | Ehringer | 75—207X |
| 3,346,427 | 10/1967 | Baldwin | 29—420.5X |
| 3,382,051 | 5/1968 | Barnett | 29—182.5 |
| 2,949,358 | 8/1960 | Alexander | 75—176 |
| 3,087,234 | 4/1963 | Alexander | 29—182.5 |
| 3,159,908 | 12/1964 | Anders | 29—182.5 |
| 3,317,285 | 5/1967 | Alexander | 29—182.5 |

CARL D. QUARFORTH, Primary Examiner

A. J. STEINER, Assistant Examiner

U.S. Cl. X.R.

75—206, 214, 226, 213, 221; 29—182.5

FO-1050
(5/69)

UNITED STATES PATENT OFFICE
CERTIFICATE OF CORRECTION

Patent No. 3,551,992          Dated January 5, 1971

Inventor(s) Daniel J. Maykuth and Horace R. Ogden

It is certified that error appears in the above-identified patent and that said Letters Patent are hereby corrected as shown below:

Column 9, lines 54 and 55, "to a density of from 40 to 70 percent of theoretical" should have been deleted.

Column 10, line 28, "intrate" should read -- nitrate --.

Signed and sealed this 2nd day of November 1971.

(SEAL)
Attest:

EDWARD M. FLETCHER, JR.
Attesting Officer

ROBERT GOTTSCHALK
Acting Commissioner of Patents

Dedication 3,551,992.—*Daniel J. Maykuth*, and *Horace R. Ogden*, Columbus, Ohio. METHOD OF PRODUCING DUCTILE-TUNGSTEN BASE SHEET ALLOY. Patent dated Jan. 5, 1971. Dedication filed May 7, 1973, by the assignee, *The Battelle Development Corporation*.

Hereby dedicates to the People of the United States the entire remaining term of said patent.

[*Official Gazette December 25, 1973.*]